April 12, 1955 L. JONES 2,706,272
VOLTAGE STABILIZING CIRCUIT
Filed Nov. 3, 1949 3 Sheets-Sheet 1

INVENTOR.
LLOYD JONES
BY
ATTORNEY

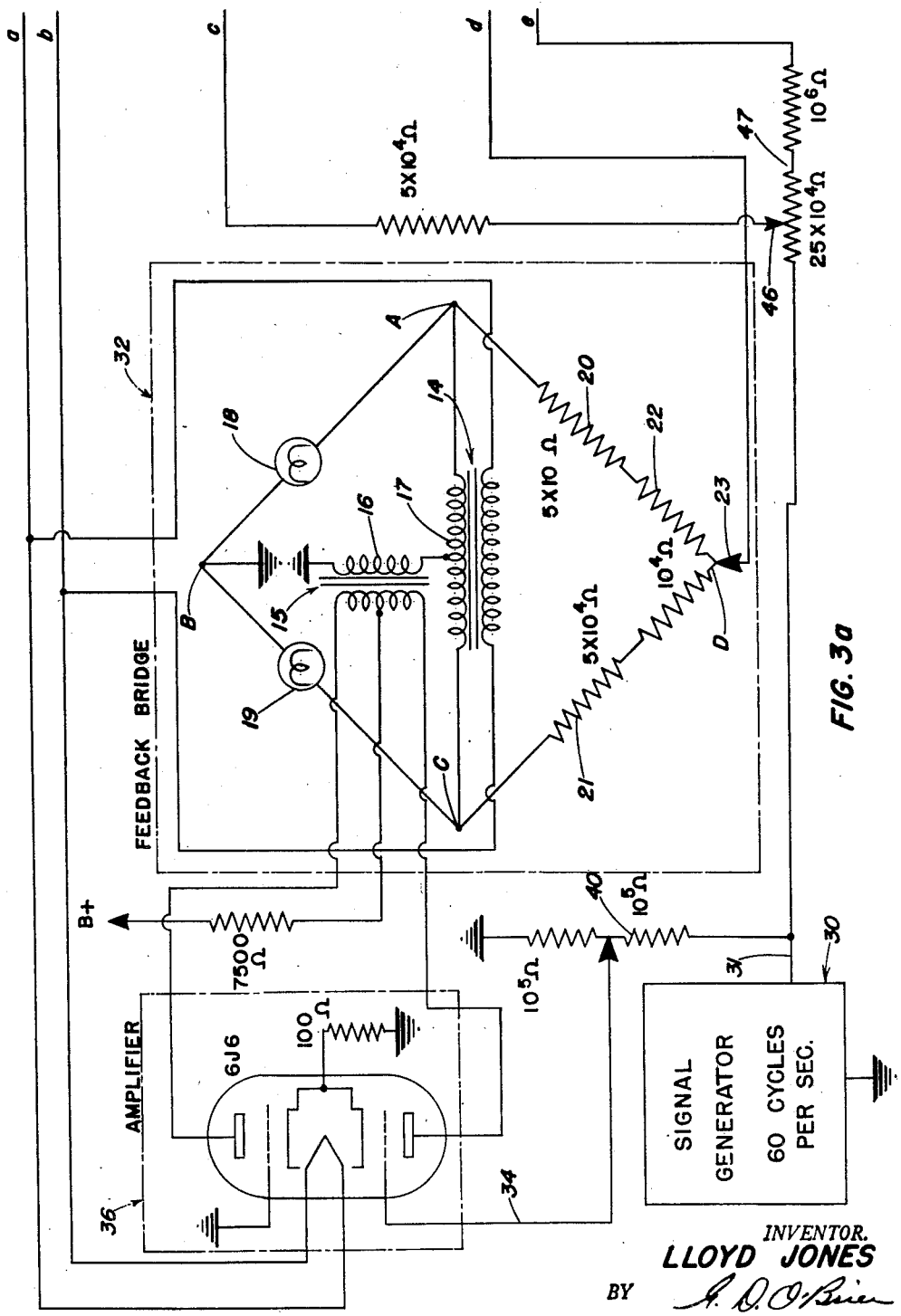

April 12, 1955

L. JONES 2,706,272

VOLTAGE STABILIZING CIRCUIT

Filed Nov. 3, 1949

INVENTOR.
LLOYD JONES
BY

ATTORNEY

United States Patent Office 2,706,272
Patented Apr. 12, 1955

2,706,272

VOLTAGE STABILIZING CIRCUIT

Lloyd Jones, Washington, D. C.

Application November 3, 1949, Serial No. 125,361

7 Claims. (Cl. 323—75)

(Granted under Title 35, U. S. Code (1952), sec. 266)

The present invention relates to voltage stabilizing circuits, and more particularly to an electrical feedback circuit, wherein a portion of a varying signal voltage is employed to produce a feedback voltage to the original varying signal, and to an electrical bridge for such a circuit, the feedback voltage varying in response to variations in the original signal and, in addition, the rate of feedback voltage variation being a function of the characteristics of the bridge.

In general, the present stabilizing circuit is designed to tap off a portion of a varying signal voltage and apply the same to a novel bridge, which in turn delivers a voltage varying in part as a function of the signal variation. The bridge output or feedback voltage is superimposed upon the signal in a desired phase relationship to accordingly vary the resultant output of the combined signal and feedback voltages. Two corresponding arms of the bridge circuit are formed of variable resistances of the temperature of current sensitive type, preferably elements whose resistances increase with an increase in temperature gradually or increase upon the application of a current thereto, such as tungsten filament electric lamps. As the tapped off voltage fed to this bridge varies in accordance with the signal voltage variations, the bridge delivers a voltage varying as a function thereof, but whose rate of variation is also a function of the effect of the variable resistances upon the bridge, as will be more fully explained in a subsequent portion of this specification.

One contemplated use of the present stabilizing circuit is in conjunction with that type of remote control system commonly referred to as a servo system. Servo system, as used in this specification, refers to that type of system wherein a synchronous director generator is electrically coupled to a synchronous receiving generator, such that nonsynchronous positioning of the director rotor with respect to the receiver rotor causes the receiving generator to deliver a voltage which is in turn applied to a servomotor, the voltage produced by the receiving generator being a function of the nonsynchronous displacement between the director generator and receiver generator rotors. The servomotor is in turn usually mechanically coupled to the rotor of the receiving generator, so that upon nonsynchronous positioning of the director and receiving rotors, the voltage delivered by the receiving generator operates by means of an electronic amplifier to energize the servomotor, which in turn drives the receiving generator rotor toward synchronous position with respect to the director generator rotor. When synchronous positioning is attained, the voltage produced by the receiving generator becomes zero, thus deenergizing the servomotor. However, the servomotor is also usually mechanically coupled to a load which it is the object of such a servo system to position in accordance with the position of the director rotor, and the momentum of the load and motor, when such an elementary servo system is employed, often carries the load, the servomotor, and the receiving generator rotor beyond synchronous position with respect to the director rotor. Upon such an occurrence, the receiving generator again produces a voltage as a result of its rotor's nonsynchronous position with respect to the director rotor, but in inverted phase with respect to the previous voltage produced in order to drive the servomotor and the load in the opposite direction back toward synchronous position with the director rotor. It is apparent, therefore, that before the load is positioned in synchronism with the director it hovers about the synchronous position resulting in an effect frequently referred to as hunt. However, by the inclusion of the present stabilizing circuit in such a servo system, and by superimposing upon the receiving generator produced signal a feedback voltage obtained from the present stabilizing circuit, the servo system may be critically damped to eliminate hunt, or if desired may be overdamped or underdamped.

It is, therefore, one object of the present invention to provide a stabilizing circuit for use in conjunction with a signal producing circuit to effectuate electrical feedback damping of the signal.

Another object of the present invention is to provide an electric bridge comprising in part impedances whose impedance values vary as a function of a characteristic of a current applied thereto.

Another object of the present invention is to provide an electrical bridge possessing the characteristic of two phases of bridge unbalance resulting from the application of a signal voltage thereto, one phase of unbalance being a voltage unbalance occurring immediately upon the application of said signal voltage thereto, the other phase of unbalance being an impedance unbalance occurring in time delayed relationship to the application of the signal voltage thereto.

A still further object of the present invention is to enable the damping of a signal voltage by the use of such a bridge as above-mentioned to provide for critical damping, overdamping, or underdamping of the signal as desired.

Other objects and advantages of the present invention will become apparent to those skilled in the art from a consideration of the following detailed description thereof made in conjunction with the accompanying drawings, in which like numerals refer to similar or corresponding parts, and wherein:

Figs. 3a and 3b taken together present a detailed wiring diagram of one embodiment of the present stabilizing circuit.

Figures 1, 2:
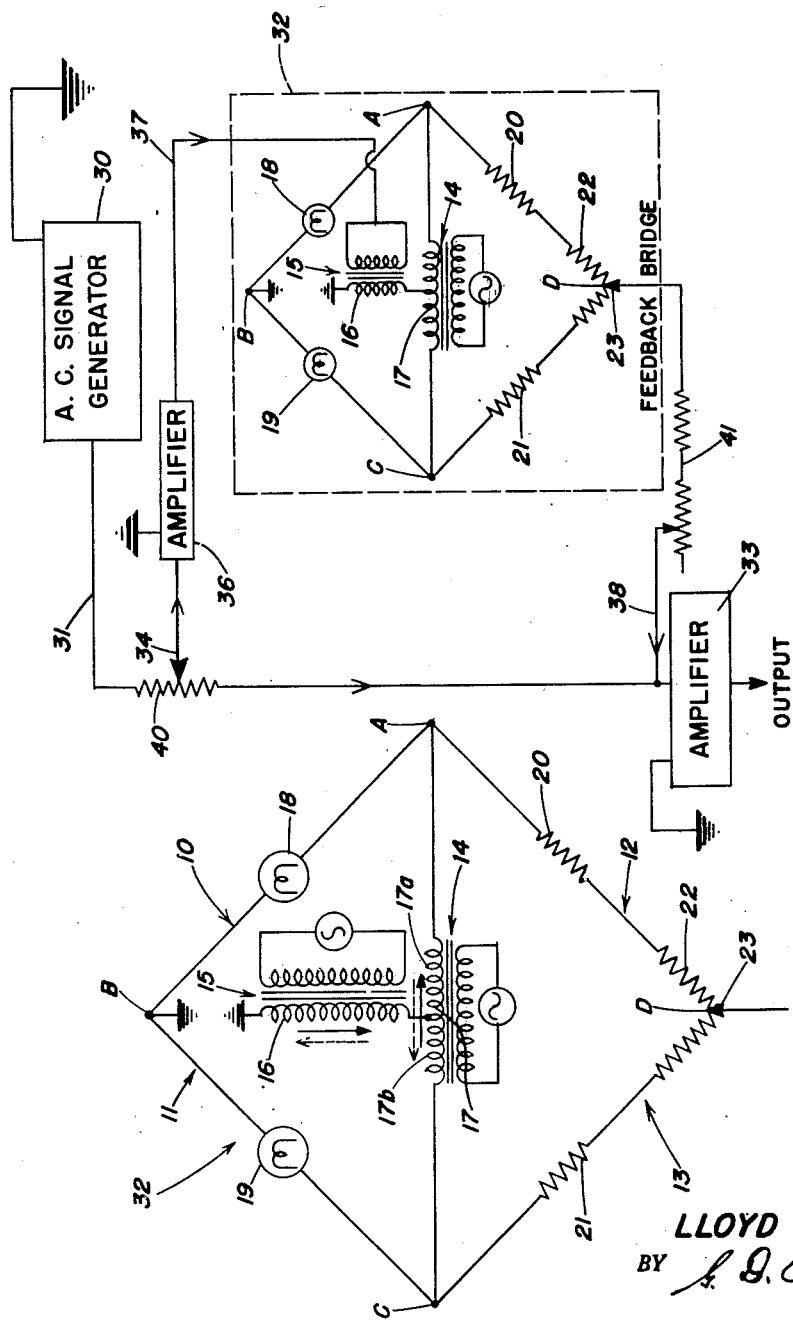
Fig. 1 is a wiring diagram of the electrical bridge.
Fig. 2 is a partially schematic wiring diagram of one embodiment of the stabilizing circuit.

Referring particularly to Fig. 1, the bridge circuit of the present stabilizer comprises two pairs of corresponding arms 10 and 11, and 12 and 13, arms 10 and 11 having the thermo or current sensitive resistances 18 and 19, arms 12 and 13 having the constant resistors 20 and 21 (The term constant resistor, as used herein, refers to that type of resistor whose impedance to current flow is relatively independent of the characteristics of the current or temperature.) and a potentiometer 22 being interposed between the arms 12 and 13. The resistances 18 and 19 are preferably elements which increase in resistance upon the elevation of temperature or result in a delayed increase in resistance upon an increase of current flow therethrough, as for example, incandescent tungsten filament electric lamps, which have been preferably matched to present substantially the same impedance characteristics to current flow. Arm 10 of the bridge is connected to arm 12 at point A and to arm 11 at point B, arm 11 is connected to arm 13 at point C, while arms 12 and 13 are connected by the potentiometer 22, the position of the tap 23 of the potentiometer 22 constituting the fourth point D of the bridge. Point B of the bridge is grounded, and in balanced bridge state the potential at point D is equal thereto. The secondary 17 of a low impedance transformer 14 is connected across the points A and C of the bridge and is center tapped to ground by the secondary 16 of a transformer 15. The resistances of this bridge thus basically present the relationship of the arms of a Wheatstone bridge.

Considering the operation of the bridge per se without regard to the remainder of the stabilizing circuit, analysis thereof will first be made under the assumed condition of zero voltage impressed on the primary of the transformer 15, while a two volt output is carried by the secondary 17 of the transformer 14 forming the operating voltage supply therefor. At the instant when current is flowing through the transformer secondary 17 in the direction indicated by the solid arrow, the point C of the bridge attains a potential two volts different than that attained by point A. If the bridge circuit is in the state of impedance balance, or in other words, if the ratio of the impedance (resistance in the present embodiment of this bridge circuit being the only practical impedance factor in the resistance elements) of lamp 18 to that of lamp 19 is equal to the ratio of the impedance of resistor 20 plus that portion of the potentiometer 22 which is in arm 12 of the bridge to the impedance of the resistor 21 plus that portion of the potentiometer 22 which is in arm 13 of the bridge, points B and D of the bridge carry an equal potential, and if the lamps 18 and 19 are perfectly matched the potential relative to these points B and D is plus one volt at point C, for with the two volt potential existing between the points A and C there is a one volt drop across arms 10 and 12 and likewise across arms 11 and 13 of the bridge. Since point B is grounded and since the secondary 17 of transformer 14 is center tapped to ground through secondary 16, there is essentially presented an electrical connection between point B and the center of the secondary 17. However, under the present state of the bridge no current would flow through this connection because both point B and the center point of the secondary 17 are at ground or zero potential. Since point B is fixed at ground potential, the absolute potentials of the bridge are fixed with reference thereto, and at balanced bridge state point C is at plus one volt, points B and D are at zero volts, point A is at minus one volt, and the center tap of secondary 17 is at zero volts absolute potential; therefore, the potential impressed upon the tap 23 by the transformer 14 through this bridge circuit is zero volts absolute potential. At any instant when the current through the secondary 17 of transformer 14 is flowing in the direction indicated by the dashed arrow, the operation of the bridge circuit is identical to that described above for the instant when current is flowing in the direction of the solid arrow except that the potentials of points A and C are also reversed. The absolute potentials then are point A plus one volt, point C minus one volt, and points B and D zero volts. Thus, it is apparent that at balanced bridge condition and with zero voltage being applied to the primary of transformer 15, the current produced by transformer 14 leaves the points B and D at zero volts absolute potential at all times.

Considering next the operation of this bridge when a signal voltage is impressed upon the secondary 16 by the primary of the transformer 15, it will first be analyzed at the instant when the current impressed upon the secondary 16 by its primary and the current impressed upon the secondary 17 by its primary are in the direction indicated by the solid arrows and the voltage supplies for transformers 14 and 15 are in exact time phase. At the instant of current flow in the direction of the solid arrows, it is apparent that the voltage produced by the secondary 16 at the center tap of the transformer 17 tends to add to the half of the transformer's secondary indicated by the numeral 17a, while it tends to buck the voltage produced in the other half of the secondary 17 indicated by the numeral 17b. If, for example, the voltage impressed upon the secondary 16 is one volt, if perfect matching of the lamps 18 and 19 has been obtained, and if the bridge was in balanced state before the application of the potential from the transformer 15, the one volt thus impressed on the center tap of secondary 17 adds to the one volt of the half 17a of secondary 17 to produce an absolute potential of minus two volts at point A and bucks the one volt potential produced by the half 17b of the secondary 17 to place point C at zero volts absolute potential, point B remaining at an absolute potential of zero volts. Therefore, in the electric lamp half of the bridge there is a two volt drop across lamp 18 and zero volts across lamp 19; while in the constant resistor half of the bridge there is a one volt drop in potential between points D and A and a further one volt drop in potential between points C and D, thereby placing point D at an absolute potential of minus one volt after the one volt potential from secondary 16 is applied to the bridge circuit. In the instance when the current impressed upon the secondaries 16 and 17 is flowing in the direction indicated by the dashed arrows, the one volt potential impressed on the center tap of secondary 17 by transformer 15 is still additive to the potential produced by the secondary portion 17a, to place point A at plus two volts, and still opposed to the potential produced by the secondary portion 17b, to maintain point C at zero volts, point B remaining at zero volts. Thus, it is apparent that a constant A. C. potential exists between points A and C and a constant A. C. voltage is impressed on the tap 23 at point D equal in phase and magnitude to that impressed upon the secondary 16 of the transformer 15, although the instantaneous potential at the point D and that impressed on the tap 23 fluctuates in exact correspondence with the instantaneous potential impressed upon the secondary 16 in accordance with its voltage cycle. In the event that the potential impressed upon the secondary 16 is displaced by 180 electrical degrees with respect to the potential impressed upon the secondary 17 from the phase relationship indicated hereinabove, the potential at point D of the bridge is also displaced by 180 electrical degrees and point C carries the two volt potential and point A is at zero volts, thereby inverting the phase cycle of the voltage impressed on tap 23 as stated.

The above-described unbalance of the bridge due to the application of a voltage upon the secondary 16 of the transformer 15 is termed a voltage unbalance, and the situation there described is only momentary in existence, for the voltage unbalance results in a higher voltage being applied to one of the lamps 18 or 19, depending upon the phase of the voltage applied to the secondary 16 with respect to that applied to secondary 17, and the elimination or reduction in voltage being applied to the other of these two lamps to produce a time delayed resistance unbalance. As a greater potential is applied to the lamp 18, for example, and a lesser potential to the lamp 19, these lamps being tungsten filament incandescent lamps, the resultant increase in temperature of lamp 18 due to the increase in current flow therethrough causes an increase in its resistance, while the cooling of lamp 19 due to the decrease in current flow therethrough causes a decrease in its resistance, these changes in resistances occurring over a period of time as lamp 18 heats up and lamp 19 cools down. The current source for transformer 14 is preferably a low impedance generator while that for transformer 15 is preferably a high impedance generator; therefore, although the variation in current flowing through the secondary 17 due to the change in resistance of the circuit does not appreciably affect the voltage impressed upon this secondary coil, in the case of transformer 15 the increase in resistance of the bridge circuit causes the potential across the secondary 16 to rise. As the lamp 18 increases in resistance, a greater potential is thus created across the secondary 16 resulting in a still greater potential being applied to the point A of the bridge circuit. In addition, if the voltage applied to secondary 16 has been less than one volt and the increase thereof resulting from the increased bridge resistance were not enough to raise it above one volt, as the resistance of lamp 19 decreases the IR drop thereacross decreases, and there would result a still greater potential being impressed upon the point A of the bridge circuit, since a greater portion of the voltage across secondary 17 is thus applied to lamp 18. Thus with the resultant increase in potential at point A (or at point C if the voltage phase of transformer 15 is shifted 180 electrical degrees with respect to the voltage phase of transformer 14), a further unbalance of the bridge is obtained, and the potential at point D rises in correspondence thereto impressing the rising voltage on the tap 23. Thus, upon the application of a voltage to the secondary 16 of transformer 15, there results an instantaneous unbalance of the bridge, a voltage unbalance, and in a period of time thereafter this unbalance is further increased by a resistance unbalance which results from the initial voltage unbalance, thereby producing a potential at point D and upon the tap 23 which at first equals the potential applied to the secondary 16 of transformer 15 and then in a period of time, as one lamp heats up and the other lamp cools down, gradually rises to a still higher value. As in the above discussion for the voltage unbalance, when considering both voltage and resistance unbalance, whether the higher potential is applied to point A or to point C, the potential at point D and the tap 23 is the same in either case, the only difference residing in the phase of the potential there applied, the voltage phases in these two instances being displaced 180 electrical degrees from each other.

The entire foregoing description of the bridge circuit illustrated in Fig. 1 and its operation has been predicated upon the asumption that lamps 18 and 19 have been chosen to present substantially matched impedances to current flow therethrough. In the event that these lamps have substantial differences in impedance characteristics, although the theory and principles of operation of the bridge as above-described are still equally applicable, the net results obtained from the operation of this bridge circuit are quite different. In such a situation, when zero potential is applied to the secondary 16 and the bridge is balanced to the current and potential applied to the transformer secondary 17 by varying the tap 23 along the resistor 22 to obtain an equal potential at points B and D, the ratio of resistance of arm 12 to arm 13 instead of being one to one, as in the case of lamps of equal impedance characteristics, equals the ratio of the impedance of lamp 18 to that of lamp 19. When a voltage is then impressed upon the transformer secondary 16, as will be apparent to one skilled in the art from the foregoing analysis of the present bridge circuit, the potential obtained at point D as a result of the initial voltage unbalance of the present bridge does not equal the voltage impressed upon the transformer secondary 16, as in the case of matched impedances for lamps 18 and 19, but a different voltage is there obtained, greater or less than the voltage applied to the transformer secondary 16 and varying therefrom in accordance with the discrepancy in impedances between the two lamps. In addition, when the voltage phase of one of the transformer secondaries is inverted with respect to the other transformer secondary, a different potential of inverted voltage phase is obtained at point D of the bridge than was obtained in the former phase relationship, the variation in the two potentials thus obtained at point D likewise being a function of the discrepancy of impedances between lamps 18 and 19. Although different characteristics are obtained from the present bridge when lamps 18 and 19 are chosen of matched impedances than when they are unmatched, it is not intended to limit the scope of the present invention to the use of lamps of matched impedance characteristics therein.

Considering the operation of the bridge circuit in a degenerative feedback system and referring for this purpose to the exemplary embodiment shown in the partially schematic diagram of Fig. 2, a signal is applied to the system by means of a signal generator 30 and through lead 31 is applied to an amplifier 33. Simultaneously therewith a portion of the signal voltage is tapped off from lead 31 by means of lead 34 and the voltage divider 40 and applied to the amplifier 36. The output of amplifier 36 is fed by lead 37 to transformer 15, and a voltage is thus impressed on transformer secondary 16 of the above-described bridge 32. The output voltage from the bridge is tapped off at point D by means of tap 23 and fed back into lead 31, carrying the original signal voltage, through lead 38 and voltage divider 41 to apply a resultant voltage to the amplifier 33. As indicated in the preceding discussion, the feedback voltage tapped off at point D may have preferably one of two voltage phase relationships, displaced from each other by 180 electrical degrees, depending upon the phase relationship existing between the voltage impressed upon the transformer secondary 16 and that impressed upon the transformer secondary 17, and the desired phase may be obtained by connecting either one or the other end of the transformer secondary 16 to the center of transformer secondary 17 while the other end thereof is grounded. Thus, it is apparent that if the signal voltage is in time phase with the voltage applied to the transformer 14, then by connecting the desired end of the transformer secondary 16 to the center of secondary 17, the feedback voltage tapped off from the bridge at point D is either exactly in phase or exactly 180 degrees out of phase with the signal voltage carried by the lead 31, and therefore the feedback voltage may be so chosen as to either buck or aid the signal voltage carried by the lead 31, thereby either decreasing or increasing the voltage applied to amplifier 33 as comparted with the original signal voltage, and correspondingly affecting the output of the amplifier 33.

If, for example, the present stabilizing circuit is employed for degenerative feedback to damp or stabilize a servo system wherein the error signal generated by the signal generator 30 is the result of nonsynchronous relationship between the director and receiving generators of the system, and wherein the output of the amplifier 33 is intended to energize a motor to bring a load and the receiving generator into synchronous position with the director, the phase of the feedback voltage would preferably be chosen to buck that of the signal by connecting the proper end of secondary 16 to the center of secondary 17. In this event, at the outset of operation the signal voltage would usually be so great that despite the relatively small bucking effect of the feedback voltage the resultant potential impressed upon the amplifier 33 would still be sufficient to saturate the amplifier tubes and result in maximum output thereof. However, as the position of the load approaches synchronism with the director, the signal voltage decreases to such a degree that at some point its potential minus the bucking potential of the feedback voltage results in a potential less than the saturation potential of the amplifier 33, and then, although the signal voltage alone would result in saturation of the amplifier and a maximum speed of movement of the load, the result of the feedback voltage is such as to tend to slow down the motion of the load before such a result would otherwise be obtained without the feedback. As synchronism of the load with the director is approached thereafter, but before synchronism is attained, there is reached a point where the negative feedback voltage exceeds the positive signal voltage, thereby inverting the phase of the output voltage of the amplifier 33 and tending to drive the load motor in the reverse direction. If the values of the various elements comprising this circuit have been properly chosen for critical damping, the effect of the reverse potential on the amplifier 33 is to exactly overcome the momentum of the motor and the load when synchronism between the load and the director is obtained, so that at the instant of zero signal voltage the load is stopped in exact synchronism with the director.

Analyzing the functioning of this circuit in the above operational example more closely, it will be seen that as the signal applied to the amplifier 33 and the portion of the error signal applied to the amplifier 36 bring these two amplifiers below their saturation point, upon further decrease of the error signal there results a decrease in the feedback voltage, for the voltage impressed upon the secondary 16 of the transformer 15 is correspondingly reduced. Considering the effect of this reduction in potential upon the bridge circuit, it is readily apparent that the unbalance of the bridge due to the potential unbalance reacts in immediate correspondence therewith; however, due to the time delay in the cooling of the heated lamp and to the heating of the cooled lamp, there results a time lag in the decrease of feedback potential with respect to the decrease in the signal potential, or in other words the rate of decrease of the feedback potential is less than the rate of decrease of the signal potential. Therefore, by properly controlling the amount of error signal fed to the bridge circuit by voltage divider 40, the desired time delay relationship may be obtained, and by further correlating therewith the amount of the feedback potential obtained from the bridge which is applied to the signal by means of voltage divider 41, perfect critical damping of a given load upon the output of the amplifier 33 may be obtained. Also, by properly adjusting these two values, either overdamping or underdamping may likewise be obtained.

Figure 3B:
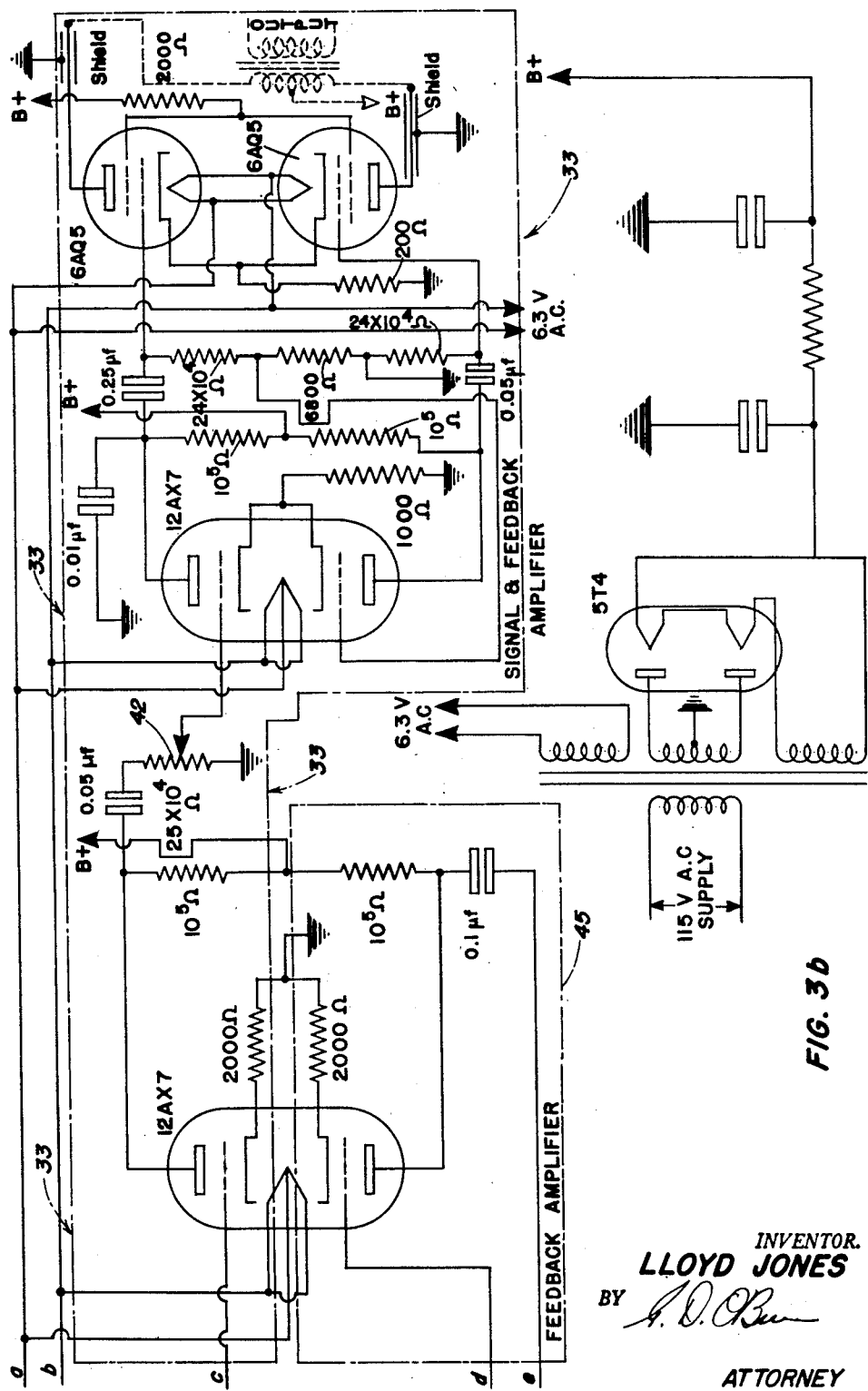

Figs. 3a and 3b combined show a detailed circuit diagram of one complete operative embodiment of such a circuit as above-described. The various corresponding parts thereof have been numbered in accordance with the above description, and the values for the various elements comprising this circuit have been indicated in the drawing. In this circuit, a portion of the signal generator produced voltage is tapped off at the voltage divider 40 and amplified in the amplifier 36; whereupon, the output of amplifier 36 is applied to the signal feedback bridge 32 and an output obtained therefrom at tap 23, all as fully described above. In the present circuit, however, the bridge output is then amplified by feedback amplifier 45, the amount of this amplified feedback potential used being established by the position of tap 46 on voltage divider 47. This amount is superimposed on the original signal voltage by voltage divider 47, and the combination is impressed on the first stage of the signal and feedback amplifier 33. The resultant feedback and original signal voltage is amplified and applied to voltage divider 42, from which any desired portion of the resultant feedback and signal voltage may be further amplified by the second and third stages in amplifier 33.

In the operation of the above-described feedback system, with zero signal voltage applied to the transformer 15 the operating voltage of transformer 14 is applied to the bridge circuit, and the tap 23 of potentiometer 22 is varied until exact balance is obtained between points B and D, or until point D is at zero potential with respect to ground. The circuit is now in readiness for operation, and upon the application of a signal voltage to lead 31 by the signal generator 30, a portion of the signal voltage is applied to the transformer 15 and hence operates upon the bridge in the manner above-described to produce a potential at point D, a portion of which is fed back into the signal voltage through lead 38 and voltage divider 41. By variation of voltage divider 40 the amount of signal applied to the transformer 15 is varied to adjust the time constant of the bridge, or the time lag of the change in resistance unbalance of the bridge to variations in the signal voltage, while the magnitude of feedback voltage is varied by adjustment of voltage divider 41. As shown in the detailed embodiment of the present invention illustrated by Figs. 3a and 3b, the feedback voltage may be amplified and the magnitude of the resultant amplified voltage of signal plus feedback may be adjusted by the voltage divider 42.

The foregoing detailed description of the present invention is presented merely by way of example, and it is not intended to limit the scope of the present invention thereto, as modifications thereof in accordance with the teachings herein will be apparent to those skilled in the art. For example, it is obvious that a plurality of lamps may be employed in each of the arms 10 and 11 of the bridge; also, instead of tungsten filament incandescent bulbs, other elements presenting a time delay impedance characteristic to current flow therethrough may be employed.

The invention described herein may be manufactured and used by or for the Government of the United States of America for governmental purposes without the payment of any royalties thereon or therefor.

What is claimed is:

1. A voltage stabilizing circuit comprising an electrical bridge, a bridge input voltage divider, a bridge output voltage divider, said bridge comprising current sensitive resistances in each of two corresponding arms thereof variable in resistance as a function of the value of current flowing therethrough, constant resistors in the two opposing corresponding arms of said bridge, a potentiometer in electrical series with said constant resistors and connecting the pair of last-mentioned corresponding arms, an operating alternating voltage source connected to place one of said pairs of corresponding arms in electrical parallel relation to the other of said pairs of corresponding arms with respect to the operating voltage thereby applied to said bridge, and means for applying to said operating voltage source the bridge input voltage as tapped off by the input voltage divider from a signal source having a phase relationship with said operating voltage, said means electrically connecting the juncture of the variable resistor arms and a point of intermediate potential on said source whereby said input voltage will instantaneously add to the voltage derived from one portion of said operating voltage source and buck the voltage derived from another portion thereof, signal voltages thereby causing an instantaneous voltage unbalance of said bridge and acting upon said current sensitive resistances to cause a time delayed resistance unbalance of said bridge, a suitable portion of the resultant bridge output for stabilizing said signal voltage as desired being derived therefrom by said output voltage divider.

2. A voltage feedback circuit comprising an electrical bridge, means for applying a portion of a signal voltage to said bridge as an input voltage therefor, means for deriving a desired feeding back portion of the output voltage of said bridge for said signal voltage, said bridge comprising impedances variable in value as a function of the value of current flowing therethrough in each of two corresponding arms of said bridge, constant impedances in the opposite two corresponding arms of said bridge, and an alternating voltage source having a phase relationship with said signal voltage connected to place one of said pairs of corresponding arms in electrical parallel relation to the other of said pairs of corresponding arms with respect to the operating voltage thereby applied to said bridge, and means electrically connecting the juncture of the variable impedance arms and a point of intermediate potential on said source for applying the input voltage of said bridge to said operating voltage source so as to instantaneously add to the operating voltage derived from one portion of said source and buck the operating voltage derived from another portion thereof, said signal voltage thereby causing an instantaneous voltage unbalance of the bridge and acting upon said current sensitive impedances to cause a time delay impedance unbalance of said bridge, resulting in corresponding changes in the bridge output voltage.

3. In a feedback amplifier circuit an electrical bridge responsive to a signal voltage for deriving a feedback voltage therefor comprising current sensitive impedances variable in value as a function of the value of current flowing therethrough in two corresponding arms of said bridge, constant resistors in the other two corresponding arms of said bridge, means for applying an operating alternating voltage having a phase relationship with said signal voltage to said bridge placing said two pairs of corresponding arms in electrical parallel relationship with each other with respect to said operating voltage, and means electrically connecting the juncture of the variable impedance arms and a point of intermediate potential on said operating voltage means for impressing said signal voltage upon said operating voltage means so as to instantaneously add to the operating voltage derived from one portion thereof and buck the operating voltage derived from another portion thereof, thereby varying the voltage output of said bridge as established by the operating voltage means to vary the feedback voltage immediately as a function of variations in said signal voltage, and said current sensitive impedances operating to produce additional time delayed variations in the voltage output of said bridge and hence in the feedback voltage with respect to corresponding variations in the signal voltage.

4. In an electrical bridge comprising two pairs of corresponding arms, one pair of said corresponding arms presenting a constant impedance to current flow therethrough, current sensitive impedances variable in impedance as a function of the value of current flowing therethrough positioned in the other two pairs of corresponding arms, an operating alternating voltage supply connected across said bridge to place corresponding arms in electrical series relationship and the pairs of corresponding arms in electrical parallel relationship, and means electrically connecting the juncture of the variable impedance arms and a point of intermediate potential on said supply for impressing upon said voltage supply a signal voltage having a phase relationship with said supply voltage whereby said signal voltage will instantaneously add to the voltage derived from one portion of said supply and buck the voltage derived from another portion of said supply, variations in said signal voltage thereby producing instantaneous output voltage changes of the bridge and changes in the impedance state of said bridge in time delayed relationship to the changes in signal voltage.

5. In an electrical bridge comprising two pairs of corresponding arms, one pair of said corresponding arms presenting a constant impedance to current flow therethrough, current sensitive impedances variable in impedance as a function of the value of current flowing therethrough positioned in the other pair of corresponding arms, an operating alternating voltage supply connected across said bridge to place corresponding arms in electrical series relationship and the pairs of corresponding arms in electrical parallel relationship, and means electrically connecting the juncture of the variable impedance arms and a point of intermediate potential on said supply for impressing upon said voltage supply a signal voltage having a phase relationship with said supply whereby said signal voltage will instantaneously add to the voltage derived from one portion of said supply and buck the voltage derived from another portion thereof, application of a signal voltage thereby producing an instantaneous voltage unbalance of the bridge and an additional impedance unbalance of said bridge in time delayed relationship to the application of the signal voltage.

6. A voltage stabilizing circuit comprising, a first and second pair of series connected resistance arms, said pairs of arms being connected in parallel to form an electrical bridge, said first pair of arms having substantially equal constant value resistance elements, said second pair of arms having substantially equal current sensitive resistance elements providing resistance values variable as a function of the current flowing therethrough, an alternating voltage source of reference frequency and phase connected in parallel with said pairs of arms, means for applying an alternating voltage error signal between a voltage midpoint of said reference alternating voltage source and the junction of the resistance elements of one of said pairs of arms, and an output circuit connected across the junctions of the resistance elements of both of said pairs of arms.

7. A voltage stabilizing circuit comprising, a first and second pair of series connected resistance arms, said pairs of arms being connected in parallel to form an electrical bridge, said first pair of arms having substantially equal constant value resistance elements, said second pair of arms having substantially equal current sensitive resistance elements providing resistance values variable as a function of the current flowing therethrough, an alternating voltage source of reference frequency and phase connected in parallel with said pairs of arms, means for applying an alternating voltage error signal between a voltage midpoint of said reference alternating voltage source and the junction of the resistance elements of said second pair of arms, and an output circuit connected across the junctions of the resistance elements of both of said pairs of arms.

References Cited in the file of this patent

UNITED STATES PATENTS

| | | |
|---|---|---|
| 1,646,269 | Warren | Oct. 18, 1927 |
| 2,025,775 | Rieber | Dec. 31, 1935 |
| 2,078,152 | Moyer | Apr. 20, 1937 |
| 2,087,950 | Holden | July 27, 1937 |
| 2,173,426 | Scott | Sept. 19, 1939 |
| 2,223,161 | Anderson | Nov. 26, 1940 |
| 2,343,759 | Fairley et al. | Mar. 7, 1944 |
| 2,370,847 | Dempster | Mar. 6, 1945 |
| 2,428,806 | Liben et al. | Oct. 14, 1947 |
| 2,487,697 | Conviser | Nov. 8, 1949 |